US010514997B2

United States Patent
Landheer

(10) Patent No.: US 10,514,997 B2
(45) Date of Patent: Dec. 24, 2019

(54) MULTI-PRODUCER SINGLE CONSUMER LOCK-FREE QUEUES WITH PRODUCER REFERENCE COUNTING

(71) Applicant: COOPER TECHNOLOGIES COMPANY, Houston, TX (US)

(72) Inventor: Ronald Landheer, Quebec (CA)

(73) Assignee: EATON INTELLIGENT POWER LIMITED, Dublin (IE)

( * ) Notice: Subject to any disclaimer, the term of this patent is extended or adjusted under 35 U.S.C. 154(b) by 331 days.

(21) Appl. No.: 15/277,683

(22) Filed: Sep. 27, 2016

(65) Prior Publication Data
US 2018/0088947 A1    Mar. 29, 2018

(51) Int. Cl.
| G06F 3/06 | (2006.01) |
| G06F 5/00 | (2006.01) |
| G06F 5/06 | (2006.01) |
| G06F 5/16 | (2006.01) |
| G06F 11/34 | (2006.01) |

(52) U.S. Cl.
CPC ........ *G06F 11/3466* (2013.01); *G06F 3/0659* (2013.01); *G06F 5/00* (2013.01); *G06F 5/065* (2013.01); *G06F 5/16* (2013.01)

(58) Field of Classification Search
CPC .... G06F 9/30021; G06F 9/30043; G06F 9/32; G06F 5/00; G06F 5/065; G06F 5/16; G06F 3/0659
See application file for complete search history.

(56) References Cited

U.S. PATENT DOCUMENTS

| 6,668,291 B1* | 12/2003 | Forin | G06F 5/065 |
| | | | 710/54 |
| 9,069,566 B1* | 6/2015 | Kumar | G06F 9/3855 |
| 2016/0070535 A1* | 3/2016 | Karr | G06F 9/5016 |
| | | | 711/110 |
| 2017/0371590 A1* | 12/2017 | Rankovic | G06F 3/0659 |

OTHER PUBLICATIONS

Prakash et al, A nonblocking algorithm for shared queues using compare-and-swap, May 1994, IEEE transactions on computers, vol. 43 No. 5, 12 pages.*
Valois, Implementing lock-free queues, Oct. 1994, Proceedings of the Seventh International Conference on Parallel and Distributed Computing Systems, 9 pages, [retrieved from the internet on Jun. 19, 2018], retrieved from URL <people.cs.pitt.edu/~jacklange/teaching/cs2510-f12/papers/implementing_lock_free.pdf>.*

(Continued)

*Primary Examiner* — Jyoti Mehta
(74) *Attorney, Agent, or Firm* — Eckert Seamans Cherin & Mellott, LLC

(57) ABSTRACT

Systems and methods associated with a multi-producer single consumer lock-free queue capable of accumulating traces is described herein. In a non-limiting embodiment, data is determined to be allocated, and a first head/tail pair indicating a location along a queue is received, the location indicating where a data bucket is able to be placed. A first data bucket to use for storing the data is determined, and the data is stored using the first data bucket. The first data bucket is then placed on the queue, and a first instruction to decrement a first reference count for the first head/tail pair is generated.

20 Claims, 6 Drawing Sheets

(56) References Cited

OTHER PUBLICATIONS

John M. Mellor-Crummey, Concurrent Queues: Practical Fetch-and-phi algorithms, Nov. 1987, Technical Report 229, 28 pages, [retrieved from the internet on Jun. 19, 2018], retrieved from URL <www.cs.rice.edu/~johnmc/papers/cqueues-mellor-crummey-TR229-1987.pdf>.*

Lamport, L., "Proving the Correctness of Multiprocess Programs", IEEE Transactions on Software Engineering, vol. SE-3, No. 2, Mar. 1977, pp. 125-143.

Michael, M.M., "Hazard Pointers: Safe Memory Reclamation for Lock-Free Objects", IEEE Transactions on Parallel and Distributed Systems, vol. 15, No. 6, Jun. 2004, pp. 491-504.

* cited by examiner

MULTI-PRODUCER SINGLE CONSUMER LOCK-FREE QUEUES WITH PRODUCER REFERENCE COUNTING

BACKGROUND

Field

The disclosed concept relates generally to a multi-producer single-consumer lock-free queue that is capable of accumulating traces.

Background Information

An error occurring in certain networking systems, such as sub-station gateway systems, protocol translation system, data concentration systems, and local control systems, and/or with smaller devices, tends to cause copious amounts of debug information to be generated. The debug information can be helpful—particularly for development purposes—however typically such debug information is not retained. For instance, many of these systems include one or more serial output ports for writing messages (e.g., the debug information) to. The serial output port(s) can, and commonly are, turned off, as writing messages takes time, and therefore can negatively impact the overall performance of the system.

Generally speaking, generation of debug information—such as debug traces—is usually turned off for most devices, as systems tend to generate a lot of information associated with the error. This means that if an error does occur, the associated information is not available. Furthermore, even if that debug information was retained, the system that had the error would need to be coupled to in order to capture the traces associated with the error, and therefore see the error. Therefore, if an error does in fact occur, the simplest mechanism for figuring out what happening is to attempt to reproduce the error and capture the traces at that point.

Furthermore, there are generally two groups of lock-free data queues. In the first group, there is an array of memory that can be written to, and a set of pointers indicating where writing can begin and where reading can begin. These pointers form a data queue, which is described by the array and the pointers. An example of lock-free queues in this group is described by "Proving the Correctness of Multiprocess Programs," by L. Lamport, published in IEEE Transactions on Software Engineering, vol. SE-3, no. 2, pp. 125-143, March 1977, the disclosure of which is incorporated herein by reference in its entirety. The second group is commonly referred to as a "bucket-based" group. A bucket-based queue corresponds to a queue including one or more data buckets with which data may be placed within. An example of lock-free queues in this group is described by "Hazard pointers: safe memory reclamation for lock-free objects," by M. M. Michael, published in IEEE Transactions on Parallel and Distributed Systems, vol. 15, no. 6, pp. 491-504, June 2004, the disclosure of which is incorporated herein by reference in its entirety.

Within the different groups of thread-safe data queues, there are various classes of thread-safe systems. For instance, there are wait-free systems, lock-free systems, and blocking systems. Wait-free systems allow data to be stored and to be placed on queues, and the like, to occur without needing to wait for any other processes to finish. Lock-free systems involve a possibility of needing to wait for another process to finish, but in the presence of multiple processes modifying the data structure, there is always at least one process that makes forward progress. With lock-free systems, there is no indefinite waiting and therefore no deadlocks will occur. Blocking systems do not guarantee that there will not be any blocking events as different processes need to synchronize with one another. Therefore, deadlock is possible.

There is, therefore, room for improvement in such systems so that traces are continually able to be generated without negatively impacting the system's performance.

SUMMARY

These needs and others are met by embodiments of the disclosed concept, which are directed to a multi-producer single-consumer lock-free queue that is capable of accumulating traces.

As one aspect of the disclosed concept, a method is described. In one non-limiting embodiment, data to be allocated is determined. A first indication of: a first reference count of a data queue being used, a first point along the data queue of where a first head of a first head/tail pair is located, and a second point along the data queue of where a first tail of the first head/tail pair is located, are received. A first instruction is generated to incremented the first reference count. A second indication of: a second reference count of the data queue being used, a third point along the data queue of where a second head of a second head/tail pair is located, and a fourth point along the data queue of where a second tail of the second head/tail pair is located, are received. In response to determining that the first indication equals the second indication, the data is stored using the first data bucket. The first data bucket is then caused to be placed on the data queue, and a second instruction is generated to decrement the first reference count.

As another aspect of the disclosed concept, a system is described. The system, in one embodiment, includes memory and at least one processor. In the one embodiment, the at least one processor is structured to determine data to be allocated. The at least one processor is structured to receive a first indication of: a first reference count of a data queue being used, a first point along the data queue of where a first head of a first head/tail pair is located, and a second point along the data queue of where a first tail of the first head/tail pair is located. The at least one processor is structured to generate a first instruction to incremented the first reference count. The at least one processor is then structured to receive a second indication of: a second reference count of the data queue being used, a third point along the data queue of where a second head of a second head/tail pair is located, and a fourth point along the data queue of where a second tail of the second head/tail pair is located. In response to determining that the first indication equals the second indication, the at least one processor is structured to store the data using the first data bucket. The at least one processor is further structured to cause the first data bucket to be placed on the data queue, and to generate a second instruction to decrement the first reference count.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
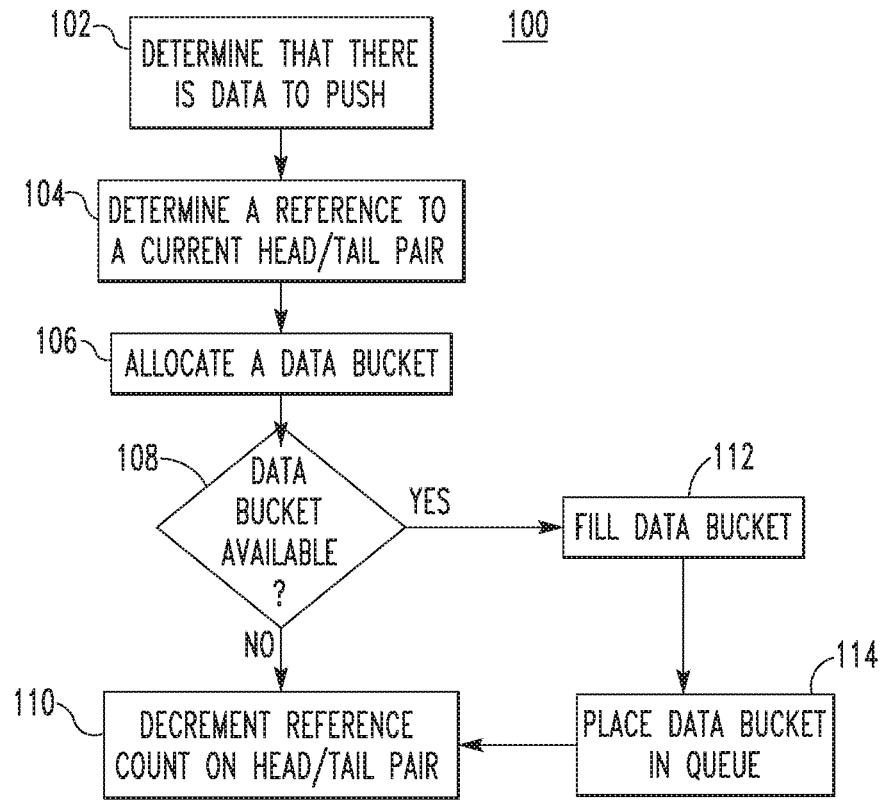
FIG. 1 is an illustrative flowchart of an exemplary data push procedure, in accordance with an embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "processor" shall mean a programmable analog and/or digital device that can store, retrieve, and process data; a computer, a workstation; a personal computer; a microprocessor; a microcontroller; a microcomputer; a central processing unit; a mainframe computer; a mini-computer; a server; a networked processor; or any suitable processing device or apparatus.

In a non-limiting, example embodiment, a multi-producer single consumer lock-free data queue process is described where traces generated by a system in response to an error or other stimuli are accumulated. For instance, traces may be generated prior to an error and may be accumulated so that information related to a run-time configuration at the time the error occurred may be obtained. Normally, traces that are generated by the producer/consumer system go directly to a serial output port. In the example embodiment, the traces are accumulated into batches, and are either put on a serial output port, or the serial output port is turned off and the traces are not put thereon, thereby decoupling trace production from output to the serial port using a producer/consumer pattern implemented by the multi-producer single-consumer queue.

As described herein, a trace, in one embodiment, corresponds to a data string that indicates a particular portion of computer-readable code that is currently being executed with particular parameters. Additionally, or alternatively, the trace also indicates that a particular event, such as an error, has occurred. Instead of, or in addition to, sending all of the data strings to the system's serial output port, which may be turned off, the data strings are batched together and retrieved from the system.

In the illustrative embodiment, an exemplary multi-producer single-consumer lock free data queue is placed between the serial output port and any system/device/process seeking to write on the serial output port. The multi-producer single-consumer data queue, therefore, is structured to accumulate the data traces thereon.

In response to an error occurring at the system, the system is typically restarted. In one embodiment, a restart of any form other than a user-initiated request to restart (e.g., failure, error, etc.), causes any traces generated within a predefined amount of time (e.g., 60 seconds) preceding that restart to be taken from the multi-producer single-consumer lock free data queue and written to a non-volatile storage medium (e.g., flash memory) prior to the restart occurring. Therefore, in the illustrative embodiment, the system will retain the data traces corresponding to the preceding predefined amount of time prior to the error occurring. If the serial output port is turned on and the traces are written to memory, in one embodiment, the traces can be retrieved from the exemplary multi-producer single-consumer lock-free data queue and directed to the serial output port and an internal data buffer that includes the data associated with a preceding predefined amount of time.

In the exemplary, non-limiting embodiment, the debug information is obtained and placed in the multi-producer single-consumer lock-free data queue, and then retrieved from the multi-producer single-consumer lock-free data queue by the consumer process. The debug information is then able to be written to memory and written to the serial port. These writings may occur simultaneously, however this is not a requirement. However, by writing to memory and the serial port at a same time, "live" debugging is able to occur to recover traces after the system reboots. Sending the data to the serial output port is asynchronous to obtaining the data and placing it in the multi-producer single-consumer lock-free data queue, and therefore has no negative impact on the system's overall performance. This allows the data traces to remain on at all times, thereby improving the system's overall performance.

The exemplary multi-producer single-consumer lock-free data queue, as described herein, corresponds to a bucket-based data queue. Generally, for any producer process that generates a trace, a data bucket will be able to be obtained to place the trace in, and the data bucket returned to the data queue. Data buckets, in one embodiment, are capable of having multiple traces placed therein from a same producer process. This limits interactions between different producer processes, as well as interactions between the producer processes and the consumer process. These interactions are where contention may occur, and therefore synchronization between the processes would be needed. To ensure that locking is not needed, in one embodiment, data buckets are atomically obtained from a data queue and atomically placed back on the data queue.

In a producer-consumer data queue, the producer will produce one trace, or a small batch of traces, at a time, and the consumer will receive all of the traces at a single time. The consumer is able to search through all of the data buckets and read all of the data stored thereby, and place the data buckets back on the queue where the data buckets can be reused by the producers.

FIG. 1 is an illustrative flowchart of an exemplary data push procedure 100, in accordance with an embodiment of the disclosed concept. Push procedure 100 generally relates to putting data (e.g., data stored by a data bucket) onto a data queue. For instance, there may be multiple queues included within the multi-producer single-consumer lock-free data queue system (e.g., two or more). The data queue is able to include a number of data buckets, in one embodiment, which can be fixed or dynamic.

In order to place data onto the data queue, a data bucket is needed within which the data is capable of being placed. After the data bucket is obtained, no additional synchronization with any other processes is needed to put the data into the data bucket. The data bucket may therefore be retained by the producing process until it is sufficiently filled. When data is placed in the data bucket, the data bucket is able to be placed back on the queue.

Procedure 100, in a non-limiting embodiment, begins at step 102. At step 102, a determination is made that there is data to be placed within a data bucket and then onto a data queue. Data need not always be available to be pushed. For example, an output function may be called even when there is no data to be output. However, in this particular scenario, various optimization techniques may be employed to reduce, or eliminate, this from occurring.

At step 104, a reference to a current head/tail pair is determined. The reference to the current head/tail pair indicates where the data bucket being placed back into the data queue is to occur. At step 106, a data bucket is allocated for the data determined to be pushed of step 102. At step 108, a determination is made as to whether or not there is a data bucket available.

If, at step 108, it is determined that no data buckets are available, then procedure 100 proceeds to step 110, where a reference count to the head/tail pair is decremented to ensure that the consumer process is able to obtain all the data. In one exemplary embodiment, there is a pair of data queues. Data buckets can be placed on a first queue of the pair, while data buckets can be removed from a second queue of the pair. The consumer process will remove data buckets from an inactive queue, so as to not introduce contention. Therefore, when the consumer process starts to remove data buckets from a queue, there are no producer processes placing data buckets on the same queue.

If at step 108 it is determined that there is a data bucket available, then procedure 100 proceeds to step 112. At step 112, the available data bucket is filled, and at step 114, the data bucket is placed back on the queue. This process, for instance, may be referred to as "enqueuing." In response to placing the data bucket back on the queue, procedure 100 proceeds to step 110, where a reference count on the head/tail pair is decremented.

Figure 2:
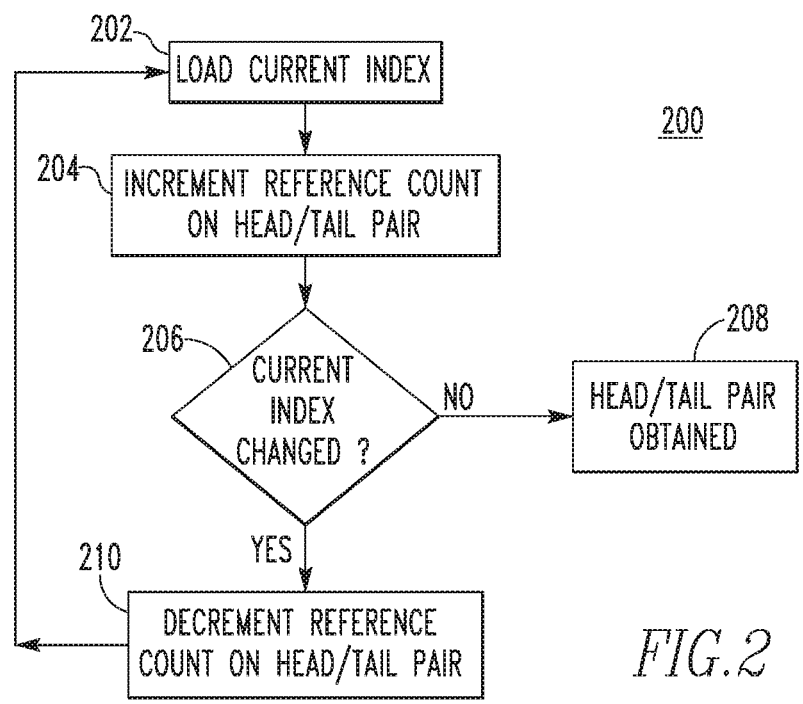
FIG. 2 is an illustrative flowchart of an exemplary procedure for obtaining a current head/tail pair for a data queue, in accordance with an embodiment of the disclosed concept.

FIG. 2 is an illustrative flowchart of an exemplary procedure 200 for obtaining a current head/tail pair for a data queue, in accordance with an embodiment of the disclosed concept. In the illustrative embodiment, procedure 200 corresponds to step 104 of FIG. 1. For instance, procedure 200 is a sub-procedure of step 104 of procedure 100. Procedure 200, in a non-limiting embodiment, begins at step 202. At step 202, a current index is loaded. The current index points to a reference count of the queue being used, and points to a pair where the head and tail of that queue are. At step 204, a reference count on a current head/tail pair is incremented. The reference count counts a number of producer processes that are currently using a particular queue. By incrementing the reference count, the producer process indicates to the consumer process to wait until the producer process has completed its task. After finishing, the producer process is capable of decrementing the reference count such that the consumer process is advised that the producer process has finished. The consumer process, typically, is not continuously running. Also, the producer process is indifferent to the value of the reference counter, which allows certain instructions to be used by the system that do not require strict synchronization semantics with the consumer process or with other producer processes. For a system including a pair of queues, for instance, one of the queues will be used by the producer processes, while the other queue will be used by the consumer process. Queuing pairs, therefore, include an index of either 0 or 1, which point to a current queue that is being used.

After incrementing the reference count, procedure 200 proceeds to step 206, where a determination is made as to whether or not the index has changed. The consumer process may change the current index during a time period between the current index being loaded and the current index being reloaded after the incrementing has occurred. If, at step 206, it is determined that the index has changed, the procedure 200 proceeds to step 210. At step 210, the reference count is decremented, and procedure 200 returns to step 202 to begin again with the new, decremented, reference count.

If, at step 206, it is determined that the index has not changed, then procedure 200 proceeds to step 208. At step 208, the current head/tail pair is obtained based on this index not having changed, as this indicates that the consumer process has not tried to interact with the queue it is using. Typically, procedure 200 needs only to repeat, at most, twice, however persons of ordinary skill in the art will recognize that this is merely exemplary.

The reference count is decremented because the producer process needs to inform the consumer process that the producer process is done producing data to be placed on the queue. However, persons of ordinary skill in the art will further recognize that the producer process need not stop producing traces at this point, as the producer process may merely stop attempting to place traces within data buckets and/or placing data buckets on a particular queue.

Figure 3:
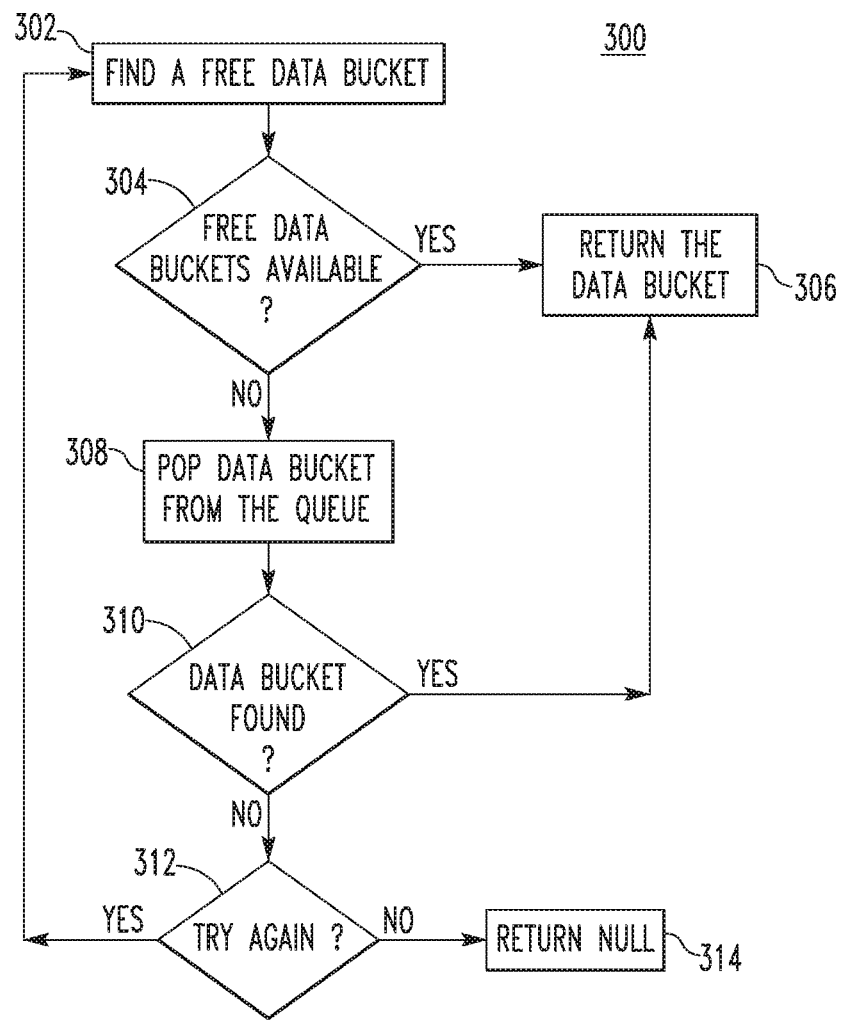
FIG. 3 is an illustrative flowchart of an exemplary procedure for allocating a data bucket, in accordance with an embodiment of the disclosed concept.

FIG. 3 is an illustrative flowchart of an exemplary procedure 300 for allocating a data bucket, in accordance with an embodiment of the disclosed concept. In the illustrative embodiment, procedure 300 corresponds to step 106 of FIG. 1. For instance, procedure 300 is a sub-procedure of step 106 of procedure 100. Procedure 300, in a non-limiting embodiment, begins at step 302. At step 302, a free data bucket is attempted to be found. A data bucket, in the illustrated embodiment, is a small structure that allows data (e.g., a trace) to be stored thereby. However, in one embodiment, the data need not be stored within the data bucket, and alternatively a pointer indicating a location of the data may be stored within the data bucket. At step 304, a determination is made as to whether or not there are any free data buckets available. Each data bucket has an index associated with it. To find a data bucket, an atomic compare and swap ("CAS") instruction is performed. In one embodiment, a number of data buckets are grouped together into groups of a predefined number of buckets such that each group is capable of being described using that predefined number-bit integer. If one of the predefined number-bits is a 1, then that corresponds to a data bucket currently being used, whereas a 0 indicates that a data bucket is free to be used. For example, groups of 32 data buckets may be formed corresponding to a 32-bit system. As another example, groups of 64 data buckets may be formed corresponding to a 64-bit system, etc.

To avoid contention between different producer processes, there may be a number of groups of data buckets. In one embodiment, each producer process is structured such that a random index is read, referred to as "index-leveling." For instance, for a 32-bit system, a 32-bit mask in an array of 32-bit masks us read, and a determination is made as to whether or not there are any zeros (e.g., "0") in that bit mask. If there is at least one zero in that selected bit mask, then that means that that group of data buckets includes at least one free data bucket. This particular scenario corresponds to a YES being determined at step 304, and procedure 300 proceeds to step 306. At step 306, the free data bucket is returned. For instance, using an atomic CAS instruction, that bucket index bit is set to one (e.g., "1") by a producer process, and that producer process "owns" that data bucket. In this particular scenario, procedure 100 then proceeds to step 108, as a data bucket has been allocated.

In one embodiment, the CAS instruction may fail even if there is a free data bucket in the group (e.g., at least one "0" in the associated bit mask). This corresponds to another producer process taking that data bucket or another data bucket of that group while the CAS instruction was being performed. In this particular scenario, procedure 300 can be repeated, where a different bit mask of the array of bit masks may be selected to search for a free data bucket.

If, however, at step 304, it is determined that there are no available data buckets in the selected group(s) (e.g., no "Os" in a selected bit mask(s)), then a data bucket is attempted to be removed from a queue. This, for instance, may be performed to avoid losing a current trace (but losing an older trace instead).

Figure 4:
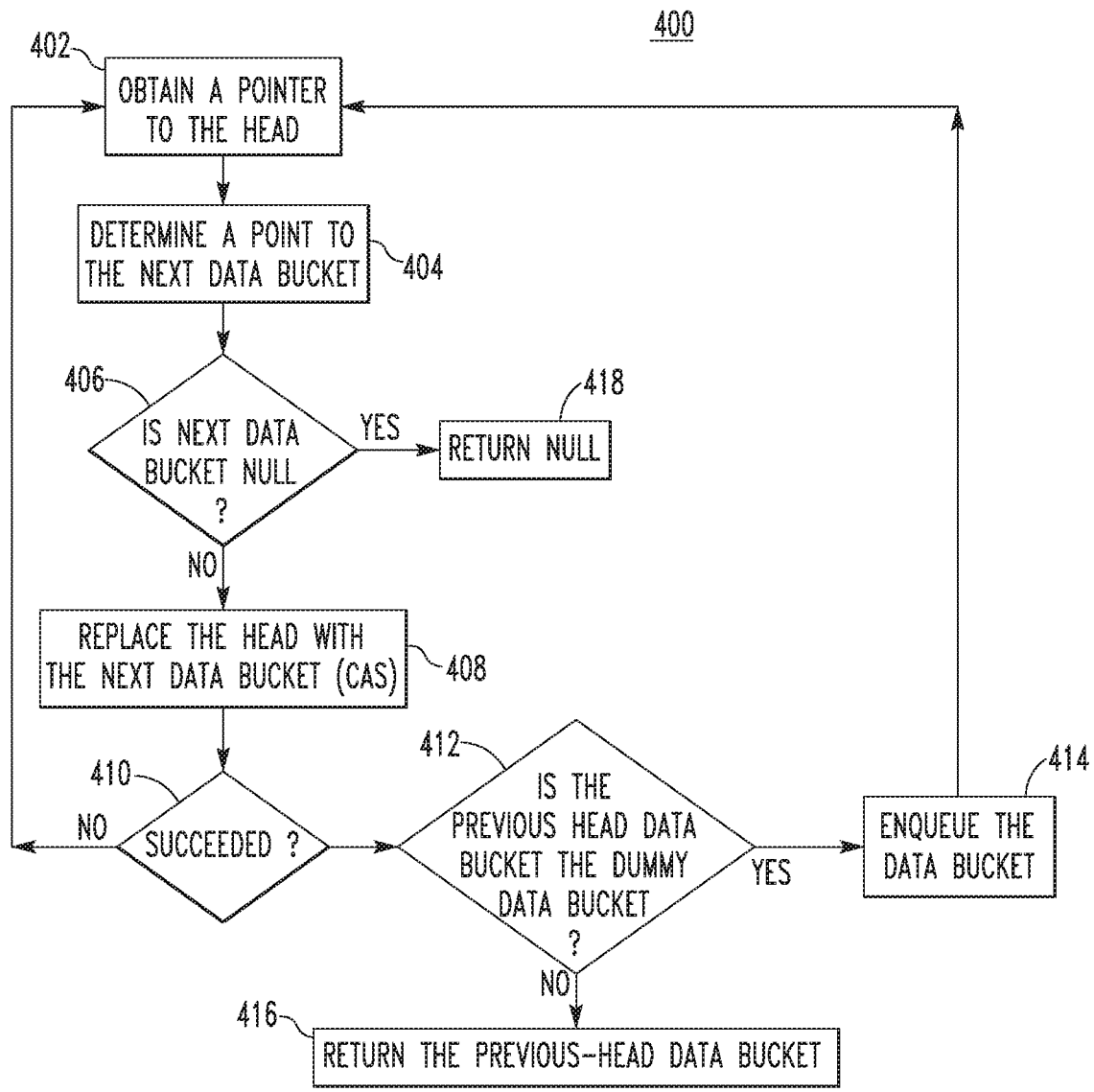
FIG. 4 is an illustrative flowchart of an exemplary procedure for obtaining and using a data bucket from the data queue, in accordance with an embodiment of the disclosed concept.

FIG. 4 is an illustrative flowchart of an exemplary procedure 400 for obtaining and using a data bucket from the data queue, in accordance with an embodiment of the disclosed concept. Procedure 400, in a non-limiting embodiment, corresponds to step 308 of FIG. 3. For instance, procedure 400 is a sub-process of step 308 of procedure 300. Generally, for instance, an older trace (e.g., a trace already stored by a data bucket on a queue) is less important than a newer trace (e.g., a trace that is being attempted to be placed within a free data bucket).

Procedure 400, in a non-limiting embodiment, begins at step 402. At step 402, a pointer to a head is obtained using the current head/tail pair. The head corresponds to a first part of the head/tail pair. The tail then corresponds to a second part of the head/tail pair. New data buckets are added to the tail of the data queue, which means that the oldest data buckets are located at the head of the data queue. In order to remove an old data bucket, the data bucket at the head of the head/tail pair is "popped" off of the data queue. At step 404, a pointer to a next data bucket is determined, the pointer to the next data bucket being described by a member of the data bucket structure. At step 406, a determination is made as to whether or not the next data bucket is null. The data queue includes a "dummy" data bucket, which may not contain any data, in one embodiment. An empty data queue includes a single data bucket, the dummy data bucket. If the dummy data bucket is found then it is placed back on the data queue. If not, then a data bucket to use is obtained.

If, at step 406, it is determined that the next data bucket is in fact null, then procedure 400 proceeds to step 418. At step 418, null is returned, as this indicates that the current queue is empty. However, if at step 406 it is determined that the next data bucket is not null, then procedure 400 proceeds to step 408. At step 408, the head of the next data bucket is attempted to be replaced using another atomic CAS instruction. At step 410, a determination is made as to whether or not the CAS instruction of step 408 succeeded. If, at step 410, it is determined that the CAS instruction of step 408 was not successful, then procedure 400 proceeds back to step 402, and procedure 400 is repeated.

If, at step 410, it is determined that the CAS instruction was successful, then procedure 400 proceeds to step 412, where another determination is made as to whether or not the previous head data bucket is the dummy data bucket. If, at step 412, it is determined that the previous head data bucket is the dummy data bucket, then procedure 400 proceeds to step 414, where the data bucket is placed back on the queue. However, if at step 412 it is determined that the previous head data bucket is not the dummy data bucket, then procedure 400 proceeds to step 416, where the previous head data bucket is returned as the data bucket that is obtained.

Returning to FIG. 3, at step 310, a determination is made as to whether or not a data bucket was found. For instance, if the data bucket was found using procedure 400 of FIG. 4, then procedure 300 of FIG. 3 proceeds to step 306, where the data bucket that was found is returned. However, if at step 310 it was determined that no data bucket was found, then procedure 300 proceeds to step 312, where a determination is made as to whether or not procedure 300 is to be repeated. In one embodiment, a predefined constant number of attempts at obtaining a data bucket for a particular trace or batch of traces is employed. For instance, procedure 300 may repeat twice, three times, four times, etc., in an attempt to obtain a free data bucket. If, at step 312, it is determined that procedure 300 is to be tried again, the procedure 300 returns to step 302. However, if at step 312 it is determined that procedure 300 is not to be tried again, then procedure 300 proceeds to step 314, where null is returned, and the trace, or batch of traces, are therefore lost.

Figure 5:
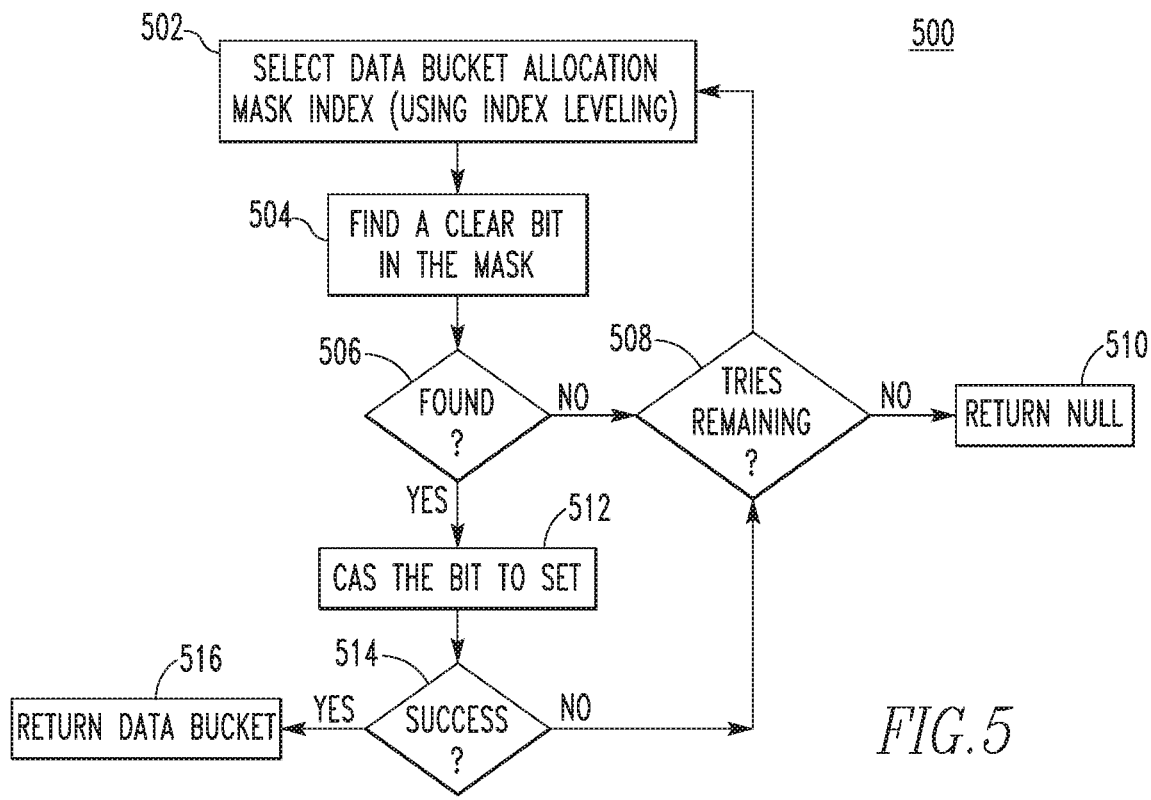
FIG. 5 is an illustrative flowchart of an exemplary procedure for finding a free data bucket, in accordance with an embodiment of the disclosed concept.

FIG. 5 is an illustrative flowchart of an exemplary procedure 500 for finding a free data bucket, in accordance with an embodiment of the disclosed concept. Procedure 500, in a non-limiting embodiment, corresponds to step 302 of FIG. 3. For instance, in one embodiment, procedure 500 is a sub-procedure of step 302 of procedure 300. Procedure 500, in one embodiment, begins at step 502. At step 502, a data bucket allocation mask index is selected. For instance, from an array of bit masks, the producer process selects a first bit mask with which to use to search for an available, free, data bucket (e.g., a "0"-bit). At step 504, a clear, or empty, bit in the selected bit mask is attempted to be found. For example, in a 32-bit mask, a "0"-bit is attempted to be found, corresponding to a data bucket that is available to place a trace in. At step 506, a determination is made as to whether or not the selected bit mask includes at least one available data bucket. For example, a determination is made as to whether or not a selected 32-bit mask includes at least one "0"-bit. If, at step 506, it is determined that there is at least one available data bucket in the selected bit mask, then procedure 500 proceeds to step 512. To avoid contention between different producer processes, there may be a number of groups of data buckets. In one embodiment, each producer process is structured such that a random index is read. For instance, for a 32-bit system, a 32-bit mask in an array of 32-bit masks is read, and a determination is made as to whether or not there are any zeros (e.g., "0") in that bit mask. If there is at least one zero in that selected bit mask, then that means that that group of data buckets includes at least one free data bucket.

At step 512, a CAS instruction is performed to the available bit of the bit mask, in an attempt to claim that bit for use. For example, a CAS instruction is performed to change a "0"-bit from the selected 32-bit mask to now be a "1"-bit. At step 514, a determination is made as to whether or not the CAS instruction of step 512 succeeded. If so, then procedure 500 proceeds to step 516, where the data bucket that has been set is returned. For example, if performing the CAS instruction of step 512 succeeds in changing a "0"-bit of the 32-bit mask to now be a "1"-bit, then that bit (e.g., data bucket) is returned for step 302 of FIG. 3.

If at step 514, it is determined that the CAS instruction did not succeed in setting the available bit, then procedure 500 proceeds to step 508. Similarly, if at step 506 it is determined that there are no clear bits in the selected bit mask, then procedure 500 also proceeds to step 508. At step 508, a determination is made as to whether or not there are any more tries remaining for obtaining an available data bucket. For example, the producer process may have a predefined constant number of tries with which to use to obtain a free data bucket (e.g., a "0" bit that can be changed to a "1"-bit using a CAS instruction). If, at step 508, it is determined that there are one or more tries remaining, then procedure 500 returns to step 502, and a new bit mask is selected from the array. However, if at step 508 it is determined that there are no more tries remaining, then procedure 500 proceeds to step 510, where null is returned. Therefore, in one particular instance, a particular trace with which was to be placed within a data bucket, is lost. However, this need not always be the case, as procedure 300 is able to proceed to step 308, where another bucket can be obtained, albeit at the expense of a single trace being lost.

Figure 6:
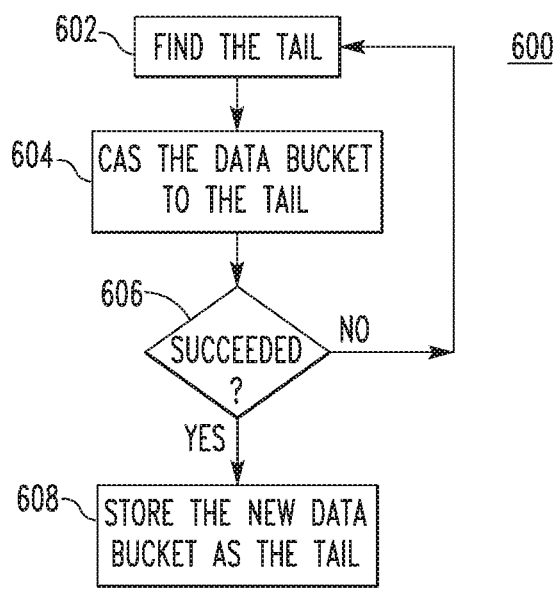
FIG. 6 is an illustrative flowchart of an exemplary procedure for placing a data bucket on the queue, in accordance with an embodiment of the disclosed concept.

FIG. 6 is an illustrative flowchart of an exemplary procedure 600 for placing a data bucket on the queue, in accordance with an embodiment of the disclosed concept. Procedure 600, in a non-limiting embodiment, corresponds to step 114 of FIG. 1. For instance, in one embodiment, procedure 600 is a sub-procedure of step 114 of procedure 100. Procedure 600, in one embodiment, begins at step 602. At step 602, a tail is found. Each data bucket includes a descriptor that indicates where a next data bucket is. Therefore, the queue may be considered to be a link list. The queue includes a pointer to a head of the queue, as part of the head/tail pair described above, which corresponds to a first data bucket in the link list. The queue also includes another pointer to a tail of the queue, also part of the head/tail pair described above, which is a hint for finding the last data bucket in the link list. The pointer to the tail, for instance, may be updated at step 608 using a simple atomic STORE instruction so as to prevent contention from occurring due to updating the tail, and may therefore correspond to a data bucket just before the last data bucket. To find the tail, the tail member of the head/tail pair is read, and the link list is followed until the actual, current tail, is found. When a CAS instruction is performed to place a new data bucket onto the queue, that tail may have changed, but the intent of step 602 is to find the actual tail in the absence of contention.

For most changes to the multi-producer single-consumer queue, a CAS instruction is used. However, updating the tail corresponds to a STORE instruction, in one embodiment. As an illustrative example, for two producer processes, a first producer will start producing, and will halt producing just before the tail is updated. A second producer process will then begin, and will update the tail. The first producer process then is resumed and sets the tail to the data bucket just before the new tail because it does not care about the actions of the second producer process.

Figure 7:
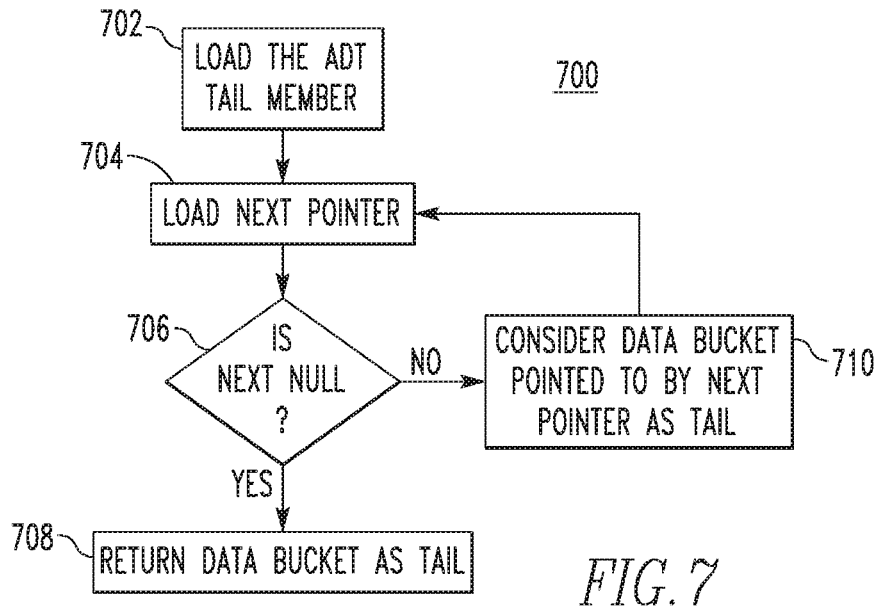
FIG. 7 is an illustrative flowchart of an exemplary procedure for finding a tail of a data queue, in accordance with an embodiment of the disclosed concept.

FIG. 7 is an illustrative flowchart of an exemplary procedure 700 for finding a tail of a data queue, in accordance with an embodiment of the disclosed concept. Procedure 700, in a non-limiting embodiment, corresponds to step 602 of FIG. 6. For instance, in one embodiment, procedure 700 is a sub-procedure of step 602 of procedure 600. Procedure 700, in one embodiment, begins at step 702. At step 702, a tail is loaded from the previously-selected head/tail pair. The tail pointer, for instance, is used to provide a hint as to where the tail should be, or where the tail really is. The tail points to a data bucket. At step 704, a next pointer, which points to where a next data bucket should be placed, is loaded. At step 706, a determination is made as to whether or not the next data bucket is null. If, at step 706, it is determined that the next data bucket is null, then procedure 700 proceeds to step 708, where the data bucket of step 702 is returned as the tail. In other words, this means that the tail indicated at step 702 really is the tail. If, however, at step 706, it is determined that the next data bucket is not null, then procedure 700 proceeds to step 710. At step 710, a data bucket pointed to by a next pointer of the next data bucket is considered to be the tail. Procedure 700 then returns to step 704, where the next pointer for the next data bucket is used to see if the subsequent next data bucket is null or not.

Returning to FIG. 6, at step 604, an atomic CAS instruction is performed to register the data bucket being added to the queue as the next bucket after the tail data bucket having been obtained at step 602. At step 606, a determination is made as to whether or not the CAS instruction succeeded at step 604. If, at step 606, it is determined that the CAS instruction succeeded, then procedure 600 proceeds to step 608, and the new data bucket is stored as the tail. If, however, at step 606 it is determined that the CAS instruction did not succeed, then procedure 600 returns to step 602 where the tail is again attempted to be found. For instance, this may correspond to another producer process also performing a CAS instruction on the same data bucket at the same time, and therefore procedure 600 is to be repeated. After storing the new data bucket as the tail, the reference count, in one embodiment, is decremented on the head/tail pair to indicate to the consumer process that the producer process has finished pushing the data into the queue.

Figure 8:
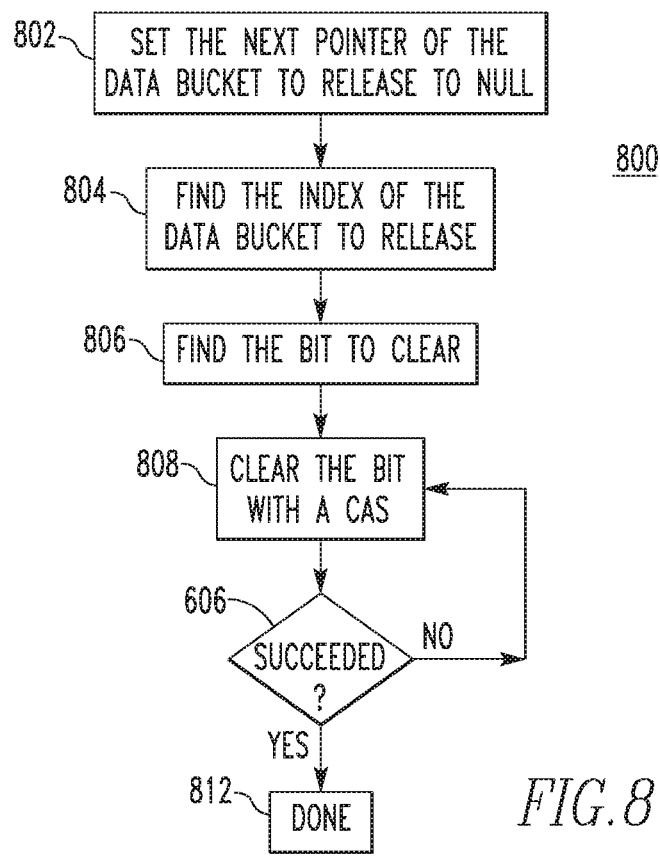
FIG. 8 is an illustrative flowchart of an exemplary procedure for releasing a data bucket, in accordance with an embodiment of the disclosed concept.

FIG. 8 is an illustrative flowchart of an exemplary procedure 800 for releasing a data bucket, in accordance with an embodiment of the disclosed concept. In one non-limiting embodiment, procedure 800 beings at step 802. At step 802, a next pointer of a data bucket to release is set to null. Setting the next pointer to null ensures that no loops occur for the link-list. At step 804, an index is found for the data bucket to be released. Each data bucket, as mentioned previously, is identified by an index. The particular bit mask with which a bit is to be set to "0"-bit (or to "1"-bit) is needed to be known.

At step 806, a bit of a bit mask is found for being cleared. For example, a bit of a 32-bit mask for a group of data buckets is found, with which an atomic CAS instruction will be used to set the bit corresponding to the allocation status of the data bucket to be cleared. At step 808, an atomic CAS instruction is performed to clear the selected bit. At step 810, a determination is made as to whether or not the CAS instruction succeeded in clearing the selected bit. If, at step 810, it is determined that the CAS instruction did in fact clear the selected bit, then procedure 800 proceeds to step 812, where procedure 800 is finished. However, if at step 810, it is determined that the CAS instruction did not succeed in clearing the selected bit, then procedure 800 returns to step 808, where another atomic CAS instruction is performed. This loop (e.g., steps 808 and 810) are repeated until the bit has been successfully cleared. Typically, only one or two iterations of the loop are needed to clear the selected bit, however more may be needed in certain embodiments. Generally, the queue is tuned such that there are more groups of data buckets (e.g., more arrays of bit masks) than there are producer processes. This means that the likelihood of contention on a single group of data buckets is substantially small. For example, there may be less than one producer process looking at a single group of data buckets at any particular time.

Figure 9:
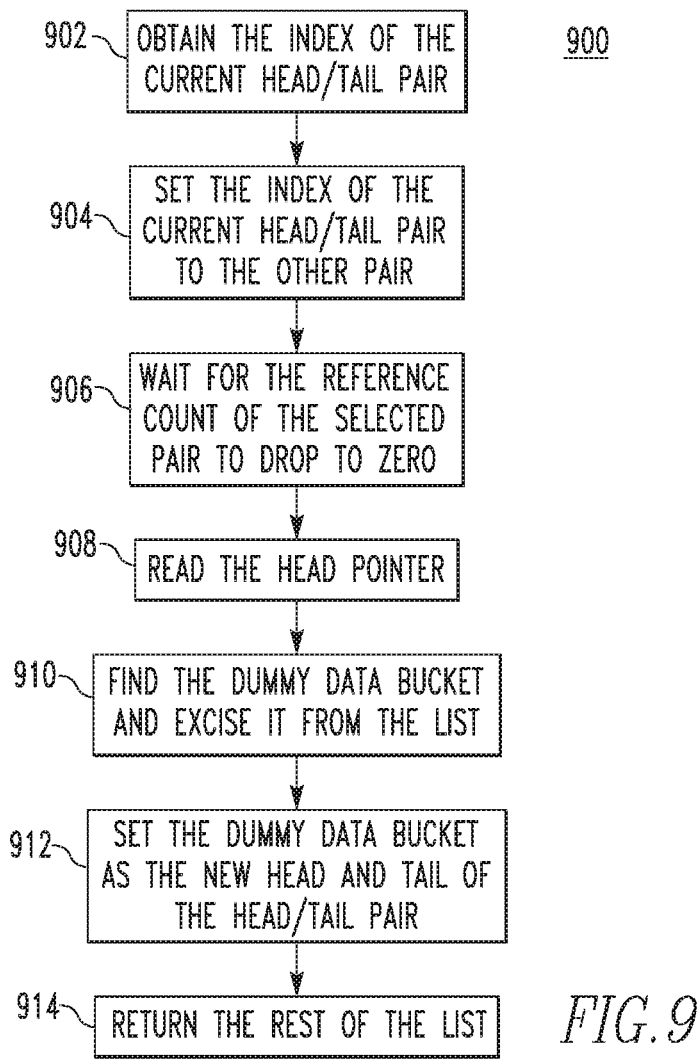
FIG. 9 is an illustrative flowchart of an exemplary procedure for removing all data buckets of a data queue, in accordance with an embodiment of the disclosed concept.

FIG. 9 is an illustrative flowchart of an exemplary procedure 900 for removing all data buckets of a data queue, in accordance with an embodiment of the disclosed concept. Procedure 900, in a non-limiting embodiment, begins at step 902. At step 902, an index to a current head/tail pair is obtained. At step 904, the index is set to be another head/tail pair (e.g., corresponding to the other queue in a pair of queues). At step 906, the producer process waits until a reference count of the selected head/tail pair becomes zero (e.g., "0"-bit). When this occurs, it indicates that all producer processes are done producing on the queue now selected for consumption.

At step 908, a head pointer is read from the head/tail pair selected in step 902 by the consumer process, and at step 910, a dummy data bucket is found and excised from the queue. After excising the dummy data bucket from the queue, the producer process now has a queue without the dummy data bucket. Typically the dummy data bucket is one of the first, if not the first, data bucket in the queue's linked list. However, if a data bucket is needed to be purged for use, such as seen by procedure 400 of FIG. 4, then the dummy data bucket may be near the end of the linked queue. The queue without the dummy data bucket, in one embodiment, includes the data buckets and all the traces that need to be processed. At step 912, the dummy data bucket is set back as the head and tail of the head/tail pair of the queue, and the rest of the queue is returned at step 914 as each data bucket is processed and freed up. To free a bucket, for example, procedure 800 of FIG. 8 may be employed.

Figure 10:
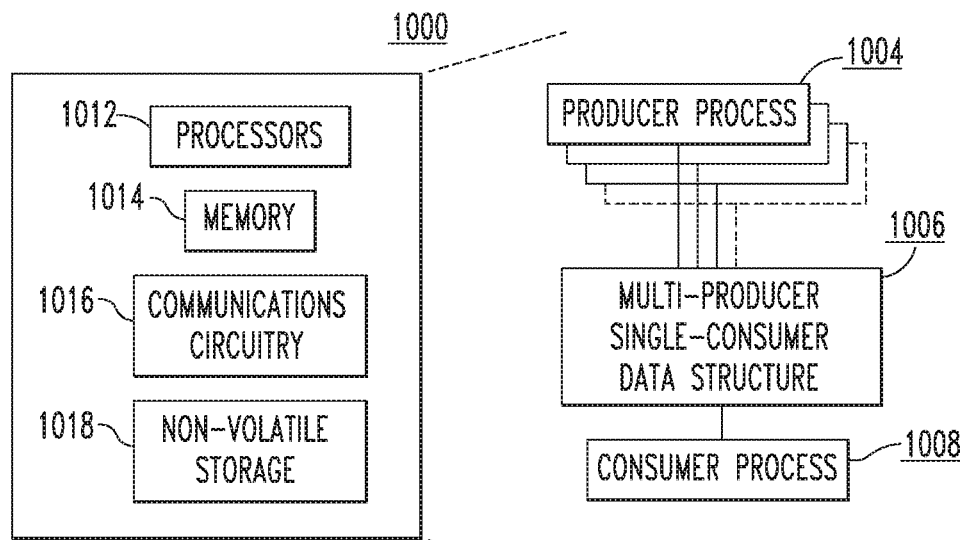
FIG. 10 is an illustrative block diagram of an exemplary communications system, in accordance with an embodiment of the disclosed concept.

FIG. 10 is an illustrative block diagram of an exemplary communications system 1000, in accordance with an embodiment of the disclosed concept. Communications system 1000, in an illustrative, non-limiting embodiment, includes one or more processors 1012, shared memory 1014, communications circuitry 1016, and non-volatile storage 1018.

Processor(s) 1012 correspond, in the illustrative embodiment, to any suitable processing circuitry capable of controlling operations and functionality of communications system 1000. In one embodiment, processor(s) 1012 include a central processing unit ("CPU"), a graphic processing unit ("GPU"), one or more microprocessors, a digital signal processor, and/or any other type of processor, or any combination thereof. The functionality of processor(s) 1012 is capable of being performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, processor(s) 1012, in one embodiment, is structured to include its own local memory, such that one or more program modules, program data, and/or one or more operating systems are capable of being stored thereby. Processor(s) 1012 are also capable of running an operating system ("OS") communications system 1000, and/or one or more firmware applications, media applications, and/or applications resident thereon.

Memory 1014 and non-volatile storage 1018, in the illustrative embodiment, corresponds to one or more types of storage mediums, and/or any removable and/or non-removable memory, which is capable of being implemented in any suitable manner to store data. For example, information may be stored using computer-readable instructions, data structures, and/or program modules. Various types of storage/memory include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 1014 is, in one embodiment, capable of being implemented as computer-readable storage media ("CRSM") corresponding to any available physical media accessible by processor(s) 1012 to execute one or more instructions stored by memory 1014.

Communications circuitry 1016, in a non-limiting embodiment, includes any circuitry capable of connecting to a communications network and/or transmitting communications to one or more devices. Communications circuitry 1016 is further capable of interfacing with a communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof. Further still, communications circuitry 1016, in one embodiment, is capable of facilitating communications using RS-232, RS-422, and/or RS-485 ports for serial communications transmissions of data.

Communications system 100 further includes multiple producer processes 1004, which in one embodiment produce messages for a consumer process 1008. In a non-limiting embodiment, producer processes 1004 use procedure 100 to push the message into a multi-producer single-consumer data structure 1006, which may be located in shared memory 1014 and thus accessible to all instances of producer processes 1004 and consumer process 1008. Consumer process 1008, in one embodiment, use procedure 900 to obtain the messages produced by producer processes 1004 from the data structure 1006 in order to process them, store them in non-volatile storage 1018 and/or emit them through communications circuitry 1016.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method for pushing data into a multi-producer single-consumer data structure located in a computer readable memory of a system having at least one processor, the method comprising:
   determining first data to be allocated;
   receiving a first indication of:
   a first reference count of a data queue being used;
   a first point along the data queue of where a first head of a first head/tail pair is located; and
   a second point along the data queue of where a first tail of the first head/tail pair is located;

generating a first instruction to increment the first reference count;
receiving a second indication of:
a second reference count of the data queue being used;
a third point along the data queue of where a second head of a second head/tail pair is located; and
a fourth point along the data queue of where a second tail of the second head/tail pair is located;
storing, in response to determining that the first indication equals the second indication, the first data using a first data bucket of the multi-producer single-consumer data structure;
causing the first data bucket to be placed on the data queue; and
generating a second instruction to decrement the first reference count.

2. The method of claim 1, wherein the data queue being used is one data queue of at least two data queues available.

3. The method of claim 1, wherein storing the first data further comprises one of:
storing the first data within the first data bucket; or
storing a pointer to the first data within the first data bucket.

4. The method of claim 1, further comprising:
prior to receiving the first indication:
receiving a third indication of:
a third reference count of the data queue being used;
a fifth point along the data queue of where a third head of a third head/tail pair is located; and
a sixth point along the data queue of where a third tail of the third head/tail pair is located;
generating a third instruction to increment the third reference count;
receiving a fourth indication of:
a fourth reference count of the data queue being used;
a seventh point along the data queue of where a fourth head of a fourth head/tail pair is located; and
an eighth point along the data queue of where a fourth tail of the fourth head/tail pair is located;
determining that the third indication differs from the fourth indication; and
generating a fourth instruction to decrement the fourth reference count.

5. The method of claim 1, wherein storing the first data using the first data bucket further comprises:
determining an available data bucket to use as the first data bucket;
selecting, from a plurality of bit masks, a first bit mask;
determining that the first bit mask includes at least the available data bucket to be used for data storage;
generating a first compare and swap ("CAS") instruction to allocate the first data bucket; and
receiving, in response to determining that the first CAS instruction was successful, the available data bucket for use as the first data bucket.

6. The method of claim 5, further comprising:
determining, prior to receiving the available data bucket, that the first CAS instruction was not successful;
selecting, from the plurality of bit masks, a second bit mask to use to search for the available data bucket;
determining that the second bit mask includes at least the available data bucket to be used for data storage;
generating a second CAS instruction to allocate the first data bucket; and
receiving, in response to determining that the second CAS instruction was successful, the available data bucket for use as the first data bucket.

7. The method of claim 1, further comprising:
determining, prior to storing the first data, that there are no available data buckets associated with the data queue;
receiving a first pointer to the first head of the data queue;
determining, based on the first pointer, a second pointer pointing to a next data bucket of the data queue;
determining that the next data bucket is not a null data bucket; and
generating a third instruction to replace the first head with the next data bucket using a CAS instruction.

8. The method of claim 1, wherein causing the first data bucket to be placed on the data queue further comprises:
determining, prior to the first data bucket being placed back on the data queue, a current tail pointer associated with the first data bucket;
determining a next tail pointer associated with the first data bucket; and
determining, based on the next tail pointer being associated with a null data bucket, that the current tail pointer corresponds to a last data bucket in the data queue.

9. The method of claim 1, further comprising:
determining an index of the first head/tail pair;
setting the index to now be a third head/tail pair;
determining, in response to a reference count associated with the third head/tail pair being zero, a head pointer for the third head/tail pair;
determining a dummy data bucket of the data queue using the head pointer;
removing the dummy data bucket from the data queue;
setting the head pointer and a tail pointer for the first head/tail pair to point to the dummy data bucket; and
clearing at least one remaining data bucket from the data queue.

10. The method of claim 9, further comprising:
setting a next pointer of the at least one remaining data bucket to clear to null;
determining an index of the at least one remaining data bucket to be cleared;
determining a bit for the at least one remaining data bucket to be cleared; and
setting, using a CAS instruction, the bit to zero.

11. A system, comprising:
memory including a routine and a multi-producer single-consumer data structure; and
at least one processor programmed with the routine which, when executed by the at least one processor, causes the at least one processor to:
determine data to be allocated;
receive a first indication of:
a first reference count of a data queue being used;
a first point along the data queue of where a first head of a first head/tail pair is located; and
a second point along the data queue of where a first tail of the first head/tail pair is located;
generate a first instruction to increment the first reference count;
receive a second indication of:
a second reference count of the data queue being used;
a third point along the data queue of where a second head of a second head/tail pair is located; and
a fourth point along the data queue of where a second tail of the second head/tail pair is located;
store, in response to determining that the first indication equals the second indication, the data using a first data bucket of the multi-producer single-consumer data structure;
cause the first data bucket to be placed on the data queue; and
generate a second instruction to decrement the first reference count.

12. The system of claim 11, wherein the data queue being used is one data queue of at least two data queues available.

13. The system of claim 11, wherein the data being stored causes the at least one processor to be further structured to:
   store the data within the first data bucket; or
   store a pointer to the data within the first data bucket.

14. The system of claim 11, wherein the at least one processor is further structured to:
   prior to receiving the first indication:
      receive a third indication of:
         a third reference count of the data queue being used;
         a fifth point along the data queue of where a third head of a third head/tail pair is located; and
         a sixth point along the data queue of where a third tail of the third head/tail pair is located;
      generate a third instruction to increment the third reference count;
      receive a fourth indication of:
         a fourth reference count of the data queue being used;
         a seventh point along the data queue of where a fourth head of a fourth head/tail pair is located; and
         an eighth point along the data queue of where a fourth tail of the fourth head/tail pair is located;
      determine that the third indication differs from the fourth indication; and
      generate a fourth instruction to decrement the fourth reference count.

15. The system of claim 11, wherein the data being stored using the first data bucket causes the at least one processor to be further structured to:
   determine an available data bucket to use as the first data bucket;
   select, from a plurality of bit masks, a first bit mask;
   determine that the first bit mask includes at least the available data bucket to be used for data storage;
   generate a first compare and swap ("CAS") instruction to allocate the first data bucket; and
   receive, in response to determining that the first CAS instruction was successful, the available data bucket for use as the first data bucket.

16. The system of claim 15, wherein the at least one processor is further structured to:
   determine, prior to receiving the available data bucket, that the first CAS instruction was not successful;
   select, from the plurality of bit masks, a second bit mask to use to search for the available data bucket;
   determine that the second bit mask includes at least the available data bucket to be used for data storage;
   generate a second CAS instruction to allocate the first data bucket; and
   receive, in response to determining that the second CAS instruction was successful, the available data bucket for use as the first data bucket.

17. The system of claim 11, wherein the at least one processor is further structured to:
   determine, prior to storing the data, that there are no available data buckets associated with the data queue;
   receive a first pointer to the first head of the data queue;
   determine, based on the first pointer, a second pointer pointing to a next data bucket of the data queue;
   determine that the next data bucket is not a null data bucket; and
   generate a third instruction to replace the first head with the next data bucket using a CAS instruction.

18. The system of claim 11, wherein the first data bucket being caused to be placed on the data queue causes the at least one processor to be further structured to:
   determine, prior to the first data bucket being placed back on the data queue, a current tail pointer associated with the first data bucket;
   determine a next tail pointer associated with the first data bucket; and
   determine, based on the next tail pointer being associated with a null data bucket, that the current tail pointer corresponds to a last data bucket in the data queue.

19. The system of claim 11, wherein the at least one processor is further structured to:
   determine an index of the first head/tail pair;
   set the index to now be a third head/tail pair;
   determine, in response to a reference count associated with the third head/tail pair being zero, a head pointer for the third head/tail pair;
   determine a dummy data bucket of the data queue using the head pointer;
   remove the dummy data bucket from the data queue;
   set the head pointer and a tail pointer for the first head/tail pair to point to the dummy data bucket; and
   clear at least one remaining data bucket from the data queue.

20. The system of claim 19, wherein the at least one processor is further structured to:
   set a next pointer of the at least one remaining data bucket to clear to null;
   determine an index of the at least one remaining data bucket to be cleared;
   determine a bit for the at least one remaining data bucket to be cleared; and
   set, using a CAS instruction, the bit to zero.

* * * * *